(12) United States Patent
Higuchi et al.

(10) Patent No.: US 8,258,739 B2
(45) Date of Patent: Sep. 4, 2012

(54) POWER CONVERTER

(75) Inventors: Tsuyoshi Higuchi, Fukuoka (JP); Kenji Yamada, Fukuoka (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/337,155

(22) Filed: Dec. 26, 2011

(65) Prior Publication Data

US 2012/0187894 A1    Jul. 26, 2012

Related U.S. Application Data

(63) Continuation of application No. PCT/JP2010/061130, filed on Jun. 30, 2010.

(30) Foreign Application Priority Data

Jul. 1, 2009    (JP) ............................. P. 2009-156473

(51) Int. Cl.
*H02P 23/00*    (2006.01)
(52) U.S. Cl. ........ 318/811; 318/810; 318/807; 318/767; 318/727
(58) Field of Classification Search .................. 318/811, 318/810, 807, 767, 727
See application file for complete search history.

(56) References Cited

U.S. PATENT DOCUMENTS 7,606,052 B2 * 10/2009 Akagi ............................. 363/40
2008/0284367 A1    11/2008 Kawashima et al.

FOREIGN PATENT DOCUMENTS

| JP | 09-084357 | 3/1997 |
| JP | 2001-069762 | 3/2001 |
| JP | 2002-139535 | 5/2002 |
| JP | 2006-109584 | 4/2006 |

OTHER PUBLICATIONS

International Search Report for corresponding International Application No. PCT/JP2010/061130, Aug. 31, 2010.
Written opinion for corresponding International Application No. PCT/JP2010/061130, Aug. 31, 2010.

* cited by examiner

*Primary Examiner* — Walter Benson
*Assistant Examiner* — David Luo
(74) *Attorney, Agent, or Firm* — Ditthavong Mori & Steiner, P.C.

(57) ABSTRACT

A power converter includes: a determination section which, prior to an actual operation, determines presence/absence of a common mode filter connected to a line for supplying power to a motor, switching elements being driven with a predetermined PWM on/off drive signal corresponding to a carrier frequency prior to the actual operation; and a PWM control method changing/setting section which, during the actual operation, changes and sets a PWM control method in accordance with a result of the determination of the presence/absence of the common mode filter.

11 Claims, 8 Drawing Sheets

POWER CONVERTER

CROSS-REFERENCE TO RELATED APPLICATIONS

The present application is a continuation application of International Application No. PCT/JP2010/061130, filed Jun. 30, 2010, which claims priority to Japanese Patent Application No. 2009-156473, filed Jul. 1, 2009. The contents of these applications are incorporated herein by reference in their entirety.

BACKGROUND OF THE INVENTION

1. Field of the Invention

The present invention relates to a power converter which supplies power to a motor.

2. Description of the Related Art

For example, Japanese Unexamined Patent Application Publication No. 2001-069762 discloses a motor drive device which includes a leak current reduction filter. In the motor drive device, common mode choke coils are connected between an inverter and an electrical device. In addition, ends of series-connected bodies of capacitors and resistors are connected to lines, respectively, between the common mode choke coils and the electrical device, and the other ends of the series-connected bodies are commonly connected. In addition, on the output side of the power converter provided is the leak current reduction filter in which the commonly-connected other ends of the series-connected bodies are connected to a virtual ground potential portion having a potential equivalent to the ground potential for frequency components higher than that of an inputted alternating-current power source.

For example, Japanese Unexamined Patent Application Publication No. 09-084357 discloses a motor drive device which includes a filter circuit for a PWM inverter. The motor drive device includes a common mode reactor inserted between the PWM inverter and an alternating-current motor which is driven by the inverter, a three-phase star-connected reactor connected to a connection point between the common mode reactor and the alternating-current motor, and a capacitor which grounds the neutral point of the reactor.

SUMMARY OF THE INVENTION

According to one aspect of the present invention, a power converter includes: a main circuit section including a plurality of switching elements and a current detector which detects an output current; a drive controller which outputs a PWM on/off drive signal to the switching elements, the drive controller driving the switching elements with a predetermined PWM on/off drive signal corresponding to a carrier frequency prior to an actual operation; a determination section which, prior to the actual operation, determines presence/absence of a common mode filter connected to a line for supplying power to a motor; and a PWM control method changing/setting section which, during the actual operation, changes and sets a PWM control method in accordance with a result of the determination of the presence/absence of the common mode filter.

According to another aspect of the present invention, a power converter includes: an initial setting mode in which prior to an actual operation of a motor, a plurality of switching elements are driven with a predetermined PWM on/off drive signal corresponding to a carrier frequency and presence/absence of a common mode filter connected to a line for supplying power to the motor is determined; and a normal operation mode in which after the initial setting mode, a PWM control method is changed and set in accordance with a result of the determination of the presence/absence of the common mode filter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Embodiments will now be described with reference to the accompanying drawings, wherein like reference numerals designate corresponding or identical elements throughout the various drawings.

Figure 1:
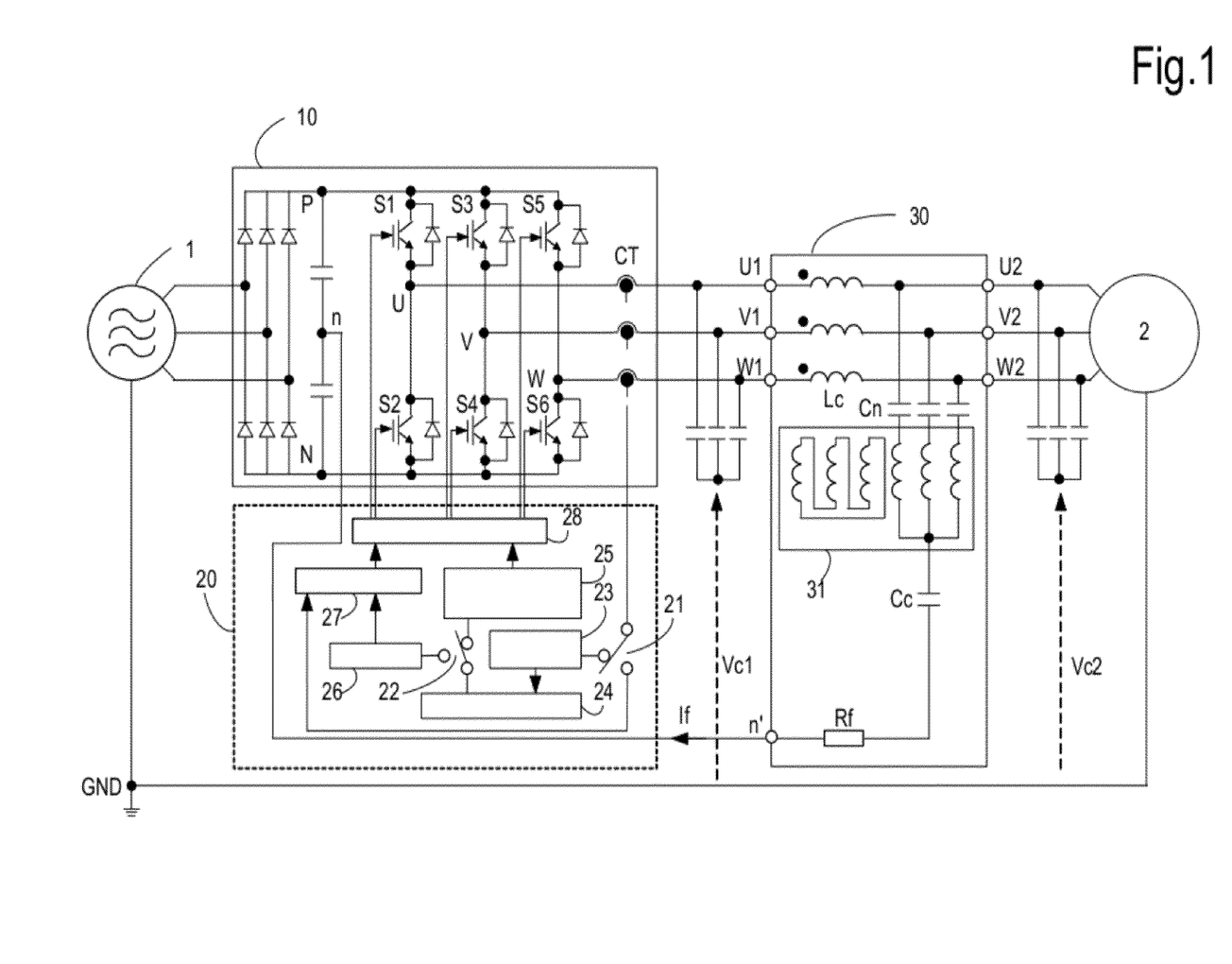
FIG. 1 is a schematic configuration diagram of a motor drive device according to an embodiment of the disclosure.

FIG. 1 is a schematic configuration diagram of a motor drive device according to an embodiment of the disclosure. The motor drive device includes a power converter (a main circuit section 10 and a drive control section 20) and a common mode filter 30 provided on the output side of the power converter.

In the power converter, an alternating-current power source 1 is inputted to the main circuit section 10, switching elements S1 to S6 in the main circuit section 10 are on/off controlled in accordance with a PWM drive signal from the drive control section 20 to perform AC-DC conversion, and then power is supplied to a motor 2 via the common mode filter 30 provided on the output side of the power converter.

The common mode filter 30 is composed of common mode choke coils Lc, capacitors Cn and Cc, a transformer 31 for normal mode current reduction, and a damping resistor Rf. In addition, U1, V1, and W1 indicate input terminals, respectively, of the common mode filter 30, and U2, V2, and W2 indicate output terminals, respectively, of the common mode filter 30. Further, Vc1 indicates a common mode voltage at a stage prior to the common mode filter 30, Vc2 indicates a common mode voltage at a stage subsequent to the common mode filter 30, and If indicates a filter current circulating through the power converter and the common mode filter 30.

The drive control section 20 includes selectors 21 and 22, a filter addition determination unit 23, a carrier frequency setter 24, a filter addition determination PWM setter 25, a PWM setter 26, a controller 27, and a PWM signal unit 28. It is noted that the selectors 21 and 22 may be configured as hardware or software. In addition, the drive control section 20 has two modes, namely, an initial setting mode prior to an actual operation of the motor drive device and an actual operation mode which is a normal operation.

First, in the initial setting mode prior to the actual operation of the motor drive device, the drive control section 20 operates as follows.

The selector 21 is connected so as to input output current detection signals from current detectors CT to the filter addition determination unit 23. In addition, the selector 22 is connected so as to input a carrier frequency setting signal from the carrier frequency setter 24 to the filter addition determination PWM setter 25.

The filter addition determination unit 23 determines whether or not the common mode filter 30 is added to the output side of the main circuit section 10, on the basis of the output current detection signals from the current detectors CT by a filter addition determination method described later.

When the filter addition determination unit 23 determines that the common mode filter 30 is added, the carrier frequency setter 24 appropriately sets a carrier frequency according to need on the basis of a filter current If including a resonant current, such that the carrier frequency of the power converter and the resonant frequency of the common mode filter 30 are not too close to each other. It is noted that the filter current If can be detected with the current detectors CT or the like provided on a current route thereof.

The filter addition determination PWM setter 25 outputs a PWM drive signal to the PWM signal unit 28 on the basis of the carrier frequency setting signal from the carrier frequency setter 24.

The PWM signal unit 28 outputs a gate drive signal to on/off drive the switching elements S1 to S6, in accordance with the PWM drive signal.

Next, in the actual operation mode which is the normal operation of the motor drive device, the drive control section 20 operates as follows.

The selector 21 is connected so as to input the output current detection signals from the current detectors CT to the controller 27. In addition, the selector 22 is connected so as to input the carrier frequency setting signal from the carrier frequency setter 24 to the PWM setter 26.

In the drive control section 20, on the basis of the output current detection signals from the current detectors CT included in the main circuit section 10, a command signal from a host (not shown), and set values in the carrier frequency setter 24 and the PWM setter 26, the controller 27 performs calculation for PWM control and outputs a PWM drive signal to the PWM signal unit 28. Further, the PWM signal unit 28 outputs the gate drive signal to on/off drive the switching elements S1 to S6, in accordance with the PWM drive signal.

It is noted that the set value (carrier frequency) in the carrier frequency setter 24 and the set value (PWM control method) in the PWM setter 26 are set in accordance with a result of the common mode filter presence/absence determination of the filter addition determination unit 23 in the aforementioned initial setting mode and changing and setting of the carrier frequency by the carrier frequency setter 24.

Figure 2:
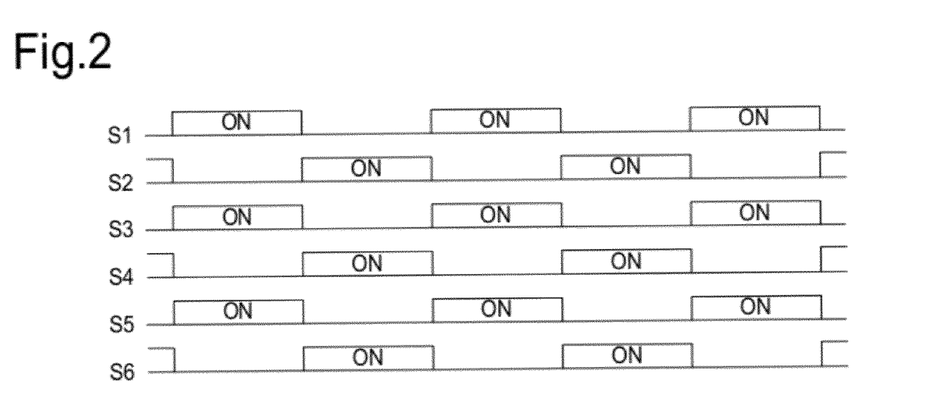
FIG. 2 shows a PWM drive signal outputted by a filter addition determination PWM setter in a case where a common mode filter is added.
Figure 3:
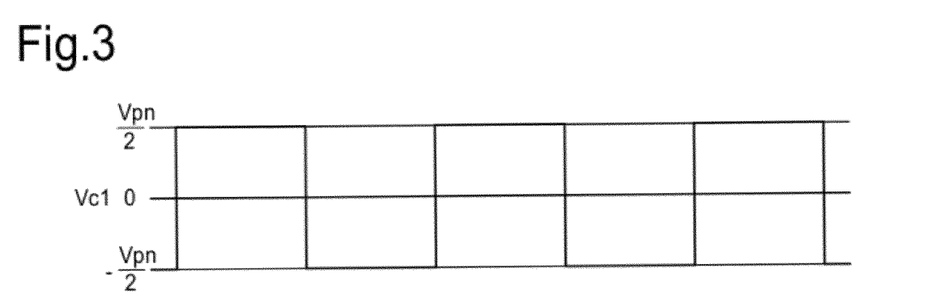
FIG. 3 shows a common mode voltage at a stage prior to the common mode filter in the case of FIG. 2.
Figure 4:
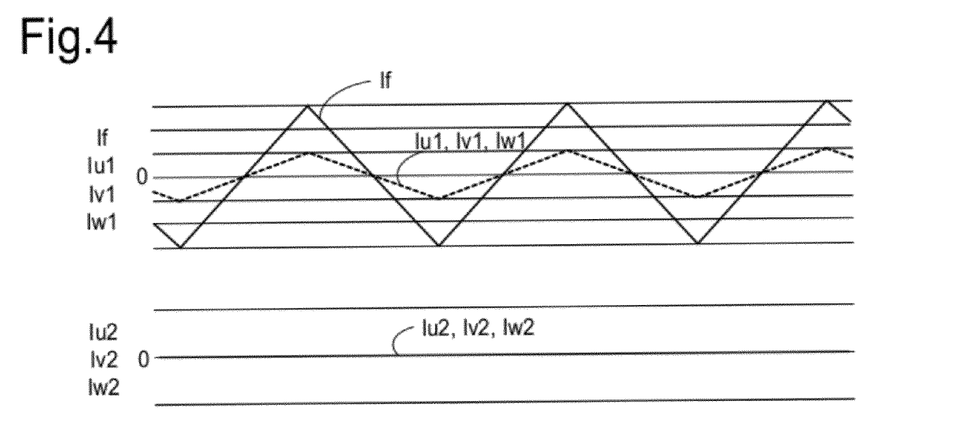
FIG. 4 is a diagram showing phase currents before and after the common mode filter and a filter current in the case of FIG. 2.

FIG. 2 is a diagram showing the PWM drive signal outputted by the filter addition determination PWM setter 25 when the common mode filter is added. FIG. 3 is a diagram showing the common mode voltage Vc1 at the stage prior to the common mode filter in the case of FIG. 2. FIG. 4 is a diagram showing phase currents Iu1, Iv1, Iw1, Iu2, Iv2, and Iw3 before and after the common mode filter and the filter current If in the case of FIG. 2. It is noted that the filter current If circulates through the power converter and the common mode filter 30.

In the initial setting mode prior to the actual operation of the motor drive device, in order for the filter addition determination unit 23 to determine addition of the common mode filter 30, the filter addition determination PWM setter 25 outputs a PWM drive signal such that a combination in which all switching elements (S1, S3, S5) on an upper arm of the main circuit section 10 are in ON states and all switching elements (S2, S4, S6) on a lower arm of the main circuit section 10 are in OFF states (hereinafter, referred to as combination A) and a combination in which all the switching elements (S1, S3, S5) on the upper arm of the main circuit section 10 are in OFF states and all the switching elements (S2, S4, S6) on the lower arm of the main circuit section 10 are in ON states (hereinafter, referred to as combination B) are alternated in carrier cycles corresponding to the carrier frequency setting signal from the carrier frequency setter 24 (see FIG. 2).

Here, the common mode voltage Vc1 on the output side of the main circuit section 10 (the common mode voltage at the stage prior to the common mode filter 30) can be represented by equation (1). It is noted that Uun, Vvn, and Vwn are a U-phase terminal voltage, a V-phase terminal voltage, and a W-phase terminal voltage, respectively, which are based on a neutral point n.

$$Vc1 = (Vun + Vvn + Vwn)/3 \quad (1)$$

Thus, the common mode voltage Vc1 on the output side of the main circuit section 10 in the combination A of the switching element on/off states in the main circuit section 10 can be represented by equation (2), and the common mode voltage Vc1 on the output side of the main circuit section 10 in the combination B can be represented by equation (3) (see FIG. 3). It is noted that Vpn is a direct-current bus PN voltage.

$$Vc1 = Vpn/2 \quad (2)$$

$$Vc1 = -Vpn/2 \quad (3)$$

Figure 5:
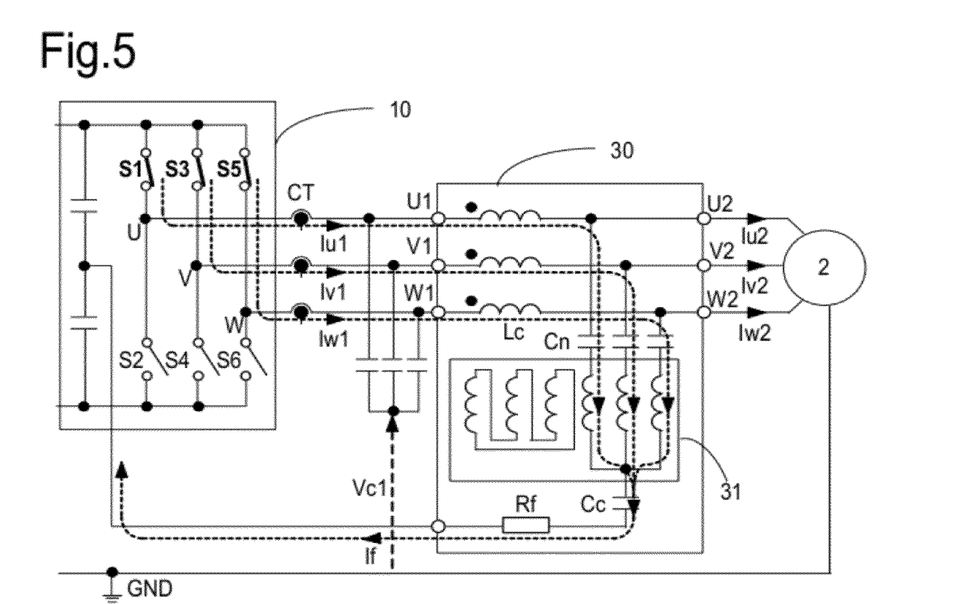
FIG. 5 is a diagram showing a current path in a case of a combination A of switching element on/off states in a power converter.
Figure 6:
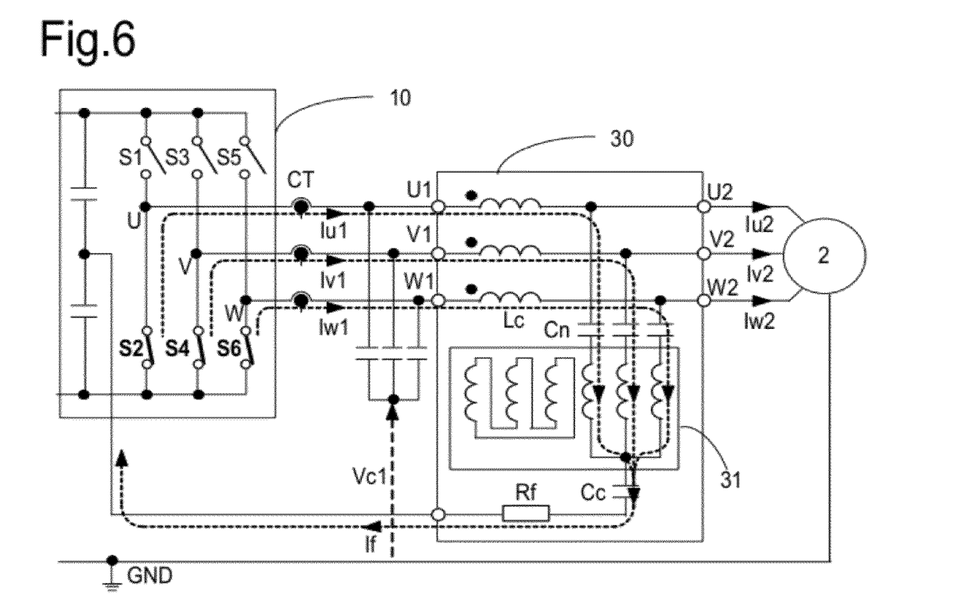
FIG. 6 is a diagram showing a current path in a case of a combination B of switching element on/off states in the power converter.

FIG. 5 is a diagram showing a current path in the case of the combination A of the switching element on/off states in the main circuit section 10. FIG. 6 is a diagram showing a current path in the case of the combination B of the switching element on/off states in the main circuit section 10.

In FIGS. 5 and 6, in both of the cases of the combination A and the combination B of the switching element on/off states in the main circuit section 10, it is in a flow-back mode, and thus power is not supplied to the motor 2 and currents Iu2, Iv2, and Iw2 to the motor do not flow. Therefore, the filter current If can be detected without varying the speed of the motor 2. As a result, it can be determined whether or not the common mode filter 30 is added.

When the common mode filter 30 is not added, the filter current If does not flow in both of the combinations A and B of the switching element on/off states in the main circuit section 10, and thus it can be determined that the common mode filter 30 is not added.

Figure 7:
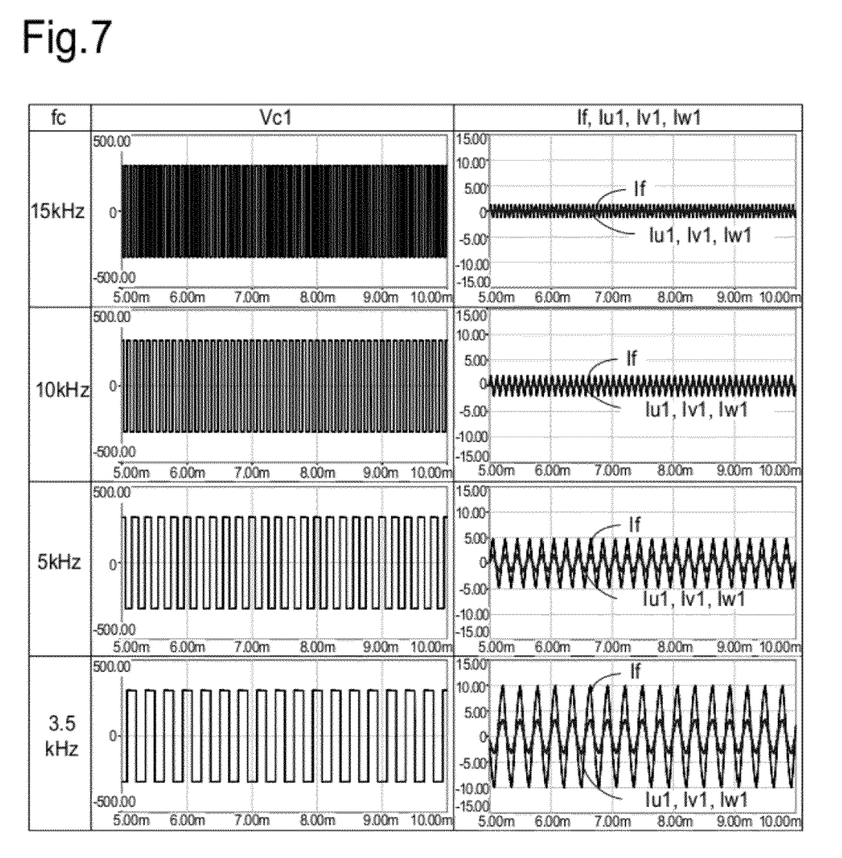
FIG. 7 is a diagram showing a measured wave pattern at each portion in the motor drive device of FIG. 1 in an initial setting mode.

FIG. 7 is a diagram showing a measured wave pattern (Vc1, If, Iu1, Iv1, Iw1) at each portion in the motor drive device of FIG. 1 in the initial setting mode. In FIG. 7, each vertical axis indicates voltage (Vc1, Vc2) or current (If, Iu1, Iv1, Iw1), and each horizontal axis is a temporal axis (Vc1, If, Iu1, Iv1, Iw1). In addition, fc is a carrier frequency in the power converter.

When looking at the common mode voltage Vc1 on the output side of the main circuit section 10, it appears that the filter addition determination PWM setter 25 outputs, to the PWM signal unit 28, the PWM drive signal based on the carrier frequency setting signal (15, 10, 5, 3.5 kHz) from the carrier frequency setter 24, as in FIG. 3, equation (2), and equation (3). It appears that the PWM signal unit 28 on/off drives the switching elements S1 to S6 in accordance with the PWM drive signal.

In the case of the initial setting mode, as described above, the currents Iu2, Iv2, and Iw2 to the motor do not flow, and thus the filter current If can be represented by equation (4) (see FIG. 3).

$$If = Iu1 + Iv1 + Iw1 = 3 \times Iu1 \quad (4)$$

Therefore, in the initial setting mode, the filter addition determination unit 23 can determine whether or not the common mode filter 30 is added to the output side of the main circuit section 10, on the basis of the relationship in equation (4) between the filter current If and the output current detection signal from the U-phase current detector CT.

Here, a case where the resonant frequency fr of the common mode filter 30 in the motor drive device of FIG. 1 is 2.9 kHz is exemplified. It appears that the filter current If (If=Iu1+Iv1+Iw1) increases as the carrier frequency fc gets close to the resonant frequency fr of the common mode filter 30 (decreases from 15 kHz to 3.5 kHz). By using a fact that when the carrier frequency fc is changed, the filter current If also changes, the resonant frequency fr of the common mode filter 30 can be calculated.

For example, the filter current If is monitored in the initial setting mode, and in accordance with fluctuation of the carrier frequency fc, the carrier frequency fc at which the filter current If has an amplitude peak can be made substantially the same as the resonant frequency fr of the common mode filter. Alternatively, when the filter current If is equal to or higher than a predetermined set value, it can be determined that the carrier frequency fc gets close to the resonant frequency fr of the filter.

Figure 8:
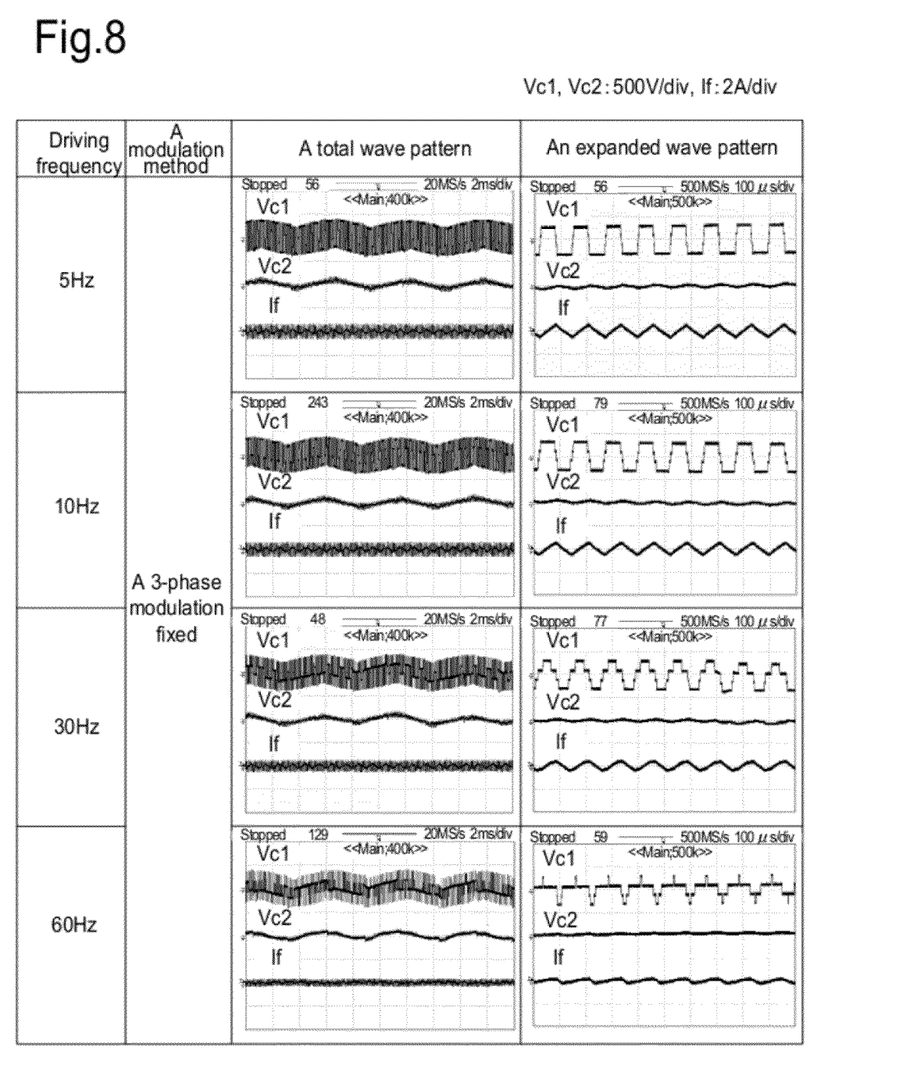
FIG. 8 is a diagram showing the relationship between the carrier frequency of the power converter and a current at each portion in the motor drive device of FIG. 1 in the initial setting mode.

FIG. 8 is a diagram showing a measured wave pattern (Vc1, Vc2, If) at each portion in the motor drive device of FIG. 1 in the actual operation mode. In FIG. 8, each vertical axis indicates voltage (Vc1, Vc2) and current (If), and each horizontal axis is a temporal axis (Vc1, Vc2, If).

Here, in the aforementioned initial setting mode, when the filter addition determination PWM setter 25 outputs the PWM drive signal to the PWM signal unit 28 on the basis of the previously-set carrier frequency setting signal to drive the switching elements (S1 to S6) in the main circuit section 10 in the combination A or B of the ON/OFF states, the filter addition determination unit 23 determines that the common mode filter 30 is added to the output side of the main circuit section 10, with the filter current If (If=3×Iu1), for example, on the basis of the output current detection signal from the U-phase current detector CT.

In addition, after the filter addition determination unit 23 determines addition of the common mode filter 30, the carrier frequency setter 24 fluctuates the carrier frequency to extract and set the carrier frequency, on the basis of the filter current If including the resonant current, such that the carrier frequency of the power converter and the resonant frequency of the common mode filter 30 are not too close to each other (carrier frequency fc=10 kHz).

Further, when the filter addition determination unit 23 determines addition of the common mode filter 30, the PWM setter 26 sets the PWM control method of the power converter to a method other than a 2-phase modulation (e.g., a 3-phase modulation, a triple harmonic superposition modulation method, or the like).

Figure 10:
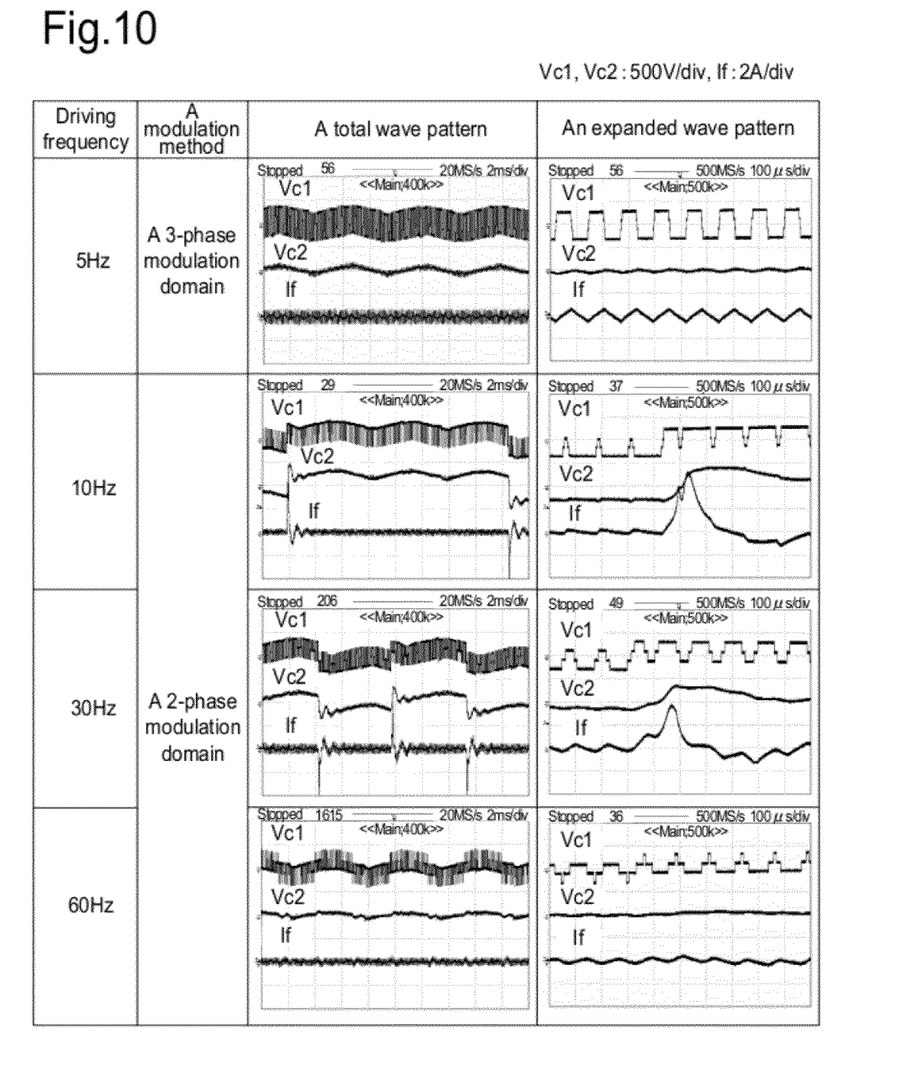
FIG. 10 is a diagram showing a measured wave pattern at each portion in a case where the motor drive device according to the embodiment of the disclosure is not used.

FIG. 10 is a diagram showing a measured wave pattern (Vc1, Vc2, If) at each portion in the case where the motor drive device according to the embodiment of the disclosure is not used. In FIG. 10, each vertical axis indicates voltage (Vc1, Vc2) and current (If), and each horizontal axis is a temporal axis (Vc1, Vc2, If).

Examples of the PWM control method of the power converter include the 3-phase modulation and the 2-phase modulation. The 2-phase modulation can reduce a switching loss by about ⅔ as compared to the switching loss in the 3-phase modulation, by causing the switching elements on each arm of the power converter to be continuously ON for a certain period. However, the 2-phase modulation is inferior in voltage accuracy to the 3-phase modulation.

In this case, the 3-phase modulation is used as a PWM control method when the number of rotations of the motor is in a low speed region, and the 2-phase modulation is used as a PWM control method when the number of rotations of the motor is in a middle and high speed region. In initial settings of the power converter, a driving frequency (corresponding to the number of rotations of the motor), which is a threshold for automatically switching the PWM control method, suffices to previously be set.

In the PWM control method in FIG. 10, the 3-phase modulation is set as the PWM control method in the low speed region (the driving frequency is less than 10 Hz), and the 2-phase modulation is set as the PWM control method in the middle and high speed region (the driving frequency is equal to or higher than 10 Hz). Further, the power converter operates, for example, at a carrier frequency of 10 kHz in the 3-phase modulation and at a carrier frequency of 15 kHz in the 2-phase modulation.

In the 3-phase modulation (the driving frequency is 5 Hz), the common mode voltage Vc2 at the stage subsequent to the common mode filter is reduced as compared to the common mode voltage Vc1 at the stage prior to the common mode filter. Meanwhile, in the 2-phase modulation (the driving frequency is 10, 30, or 60 Hz), with regard to the common mode voltage Vc2 at the stage subsequent to the common mode filter, the common mode voltage of the carrier frequency (15 kHz) element or higher is reduced, but the common mode voltage of a 3 f element (a triple element of the driving frequency) remains.

Further, with regard to the filter current If, in the 3-phase modulation, the filter current If of the carrier frequency (10 kHz) element flows, but in the 2-phase modulation, in addition to the carrier frequency (15 kHz) element, an excessively high resonant current, which flows in switching to the 2-phase modulation, flows.

When FIGS. 8 and 10 are compared to each other, since the PWM control method of the power converter is fixed (3-phase modulation) with respect to the driving frequency (5, 10, 30, 60 Hz), it appears that the problem in the case of the aforementioned 2-phase modulation can be reduced. As a result, the common mode filter characteristics can be improved.

Figure 9:
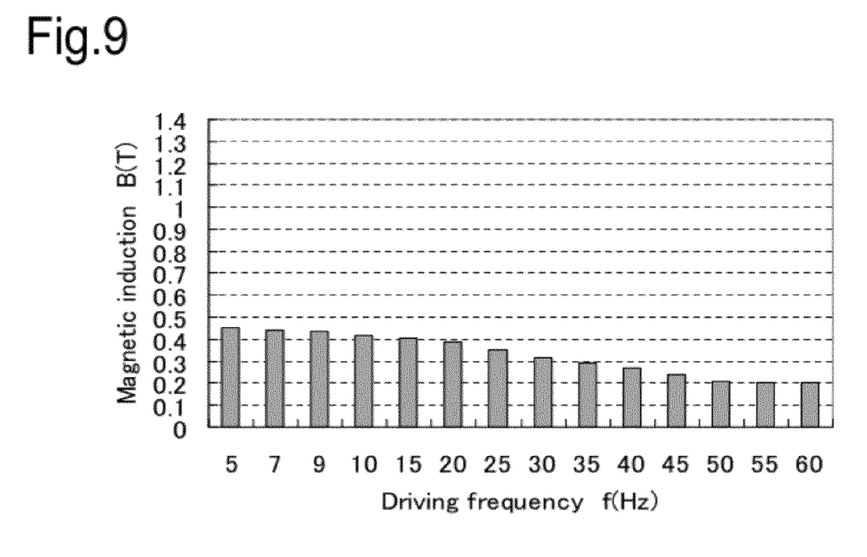
FIG. 9 is a diagram showing a magnetic flux density with respect to a driving frequency generated within common mode choke coils of the common mode filter under the condition of FIG. 8.
Figure 11:
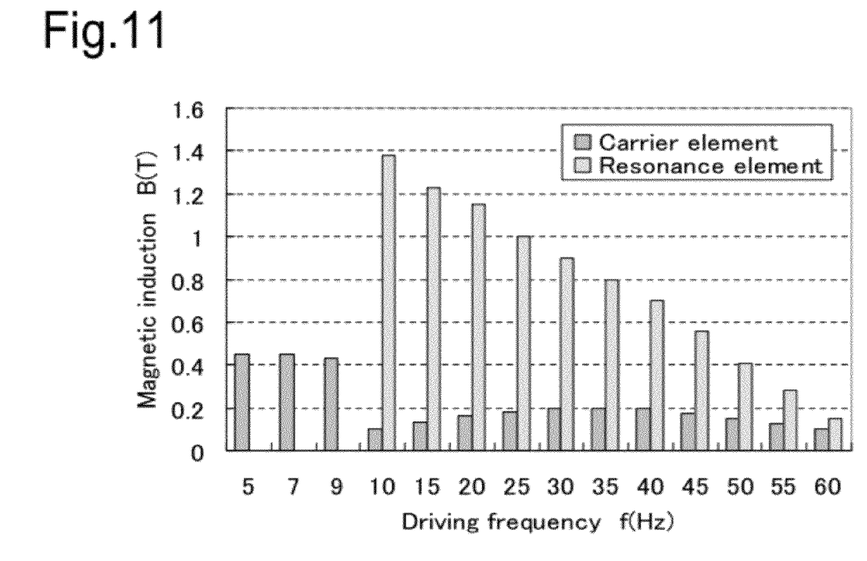
FIG. 11 is a diagram showing a magnetic flux density with respect to a driving frequency generated within the common mode choke coils of the common mode filter in the case where the motor drive device according to the embodiment of the disclosure is not used.

FIG. 9 is a diagram showing a magnetic flux density with respect to a driving frequency generated within the common mode choke coils of the common mode filter under the condition of FIG. 8. FIG. 11 is a diagram showing a magnetic flux density with respect to a driving frequency generated within the common mode choke coils of the common mode filter in the case where the motor drive device according to the embodiment of the disclosure is not used. In each drawing, the vertical axis indicates magnetic flux density B [T], and the horizontal axis indicates driving frequency [Hz].

In FIG. 11, similarly to the case of FIG. 10, with regard to the PWM control method, the 3-phase modulation is set as the PWM control method in the low speed region (the driving frequency is less than 10 Hz) and the 2-phase modulation is set as the PWM control method in the middle and high speed region (the driving frequency is equal to or higher than 10 Hz).

In FIG. 11, when looking at the magnetic flux density of the carrier frequency element, the magnetic flux density in the 3-phase modulation (the driving frequency is less than 10 Hz) is higher than that in the 2-phase modulation (the driving frequency is equal to or higher than 10 Hz).

Further, when looking at the resonance element generated in switching to the 2-phase modulation, no switching point is present since switching is originally continuously performed in the 3-phase modulation. Thus, no resonance element is present, and a resonance element is present only in the 2-phase modulation.

Therefore, in the 2-phase modulation, the magnetic flux density of the common mode choke coils is very high in switching to the 2-phase modulation, the common mode choke coils cause instant magnetic saturation, and an excessively high filter current If including the resonant current flows.

Meanwhile, in FIG. 9, the magnetic flux density of the carrier frequency element does not provide the magnetic saturation phenomenon which occurs in the 2-phase modulation. In addition, with regard to the resonance element which occurs in switching to the 2-phase modulation, no resonance element is present, since switching is originally continuously performed in the 3-phase modulation and hence no switching point is present.

Thus, unlike the 2-phase modulation, with regard to the magnetic flux density of the common mode choke coils, the common mode choke coils do not cause instant magnetic saturation, and an excessively high filter current If including the resonant current does not flow.

As described above, the motor drive device according to the embodiment of the disclosure can determine whether or not the motor drive device includes the common mode filter on the output side of the power converter. When determining that the motor drive device includes the common mode filter, the motor drive device changes and sets the PWM control method to an optimum one, and thus it can be avoided that the loss of the power converter increases due to improvement of the common mode filter characteristics and an excessively high filter current and magnetic saturation occurs in the common mode choke coils.

Further, when determining that the motor drive device includes the common mode filter, the motor drive device arbitrarily extracts and sets such a carrier frequency of the power converter as to avoid that the carrier frequency is near the resonant frequency of the common mode filter, and thus it can be avoided that the loss of the power converter increases due to improvement of the common mode filter characteristics and an excessively high filter current and magnetic saturation occurs in the common mode choke coils.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A power converter comprising:
    a main circuit section including a plurality of switching elements and a current detector which detects an output current;
    a drive controller which outputs a PWM on/off drive signal to the switching elements, the drive controller driving the switching elements with a predetermined PWM on/off drive signal corresponding to a carrier frequency prior to an actual operation;
    a determination section which, prior to the actual operation, determines presence/absence of a common mode filter connected to a line for supplying power to a motor; and
    a PWM control method changing/setting section which, during the actual operation, changes and sets a PWM control method in accordance with a result of the determination of the presence/absence of the common mode filter.

2. The power converter according to claim 1, further comprising a carrier frequency changing/setting section which, prior to the actual operation, changes and sets the carrier frequency on the basis of a filter current flowing through the common mode filter, when the determination section determines that the common mode filter is connected.

3. The power converter according to claim 1, wherein the drive controller outputs the predetermined PWM on/off drive signal such that a first combination in which all the switching elements on an upper arm are in ON states and all the switching elements on a lower arm are in OFF states and a second combination in which all the switching elements on the upper arm are in OFF states and all the switching elements on the lower arm are in ON states are alternated in carrier cycles.

4. The power converter according to claim 1, wherein the determination section determines presence/absence of the common mode filter on the basis of a filter current flowing back through the main circuit section and the common mode filter.

5. The power converter according to claim 1, wherein the PWM control method changing/setting section changes and sets the PWM control method to a method other than a 2-phase modulation when the common mode filter is connected.

6. A power converter comprising:
    an initial setting mode in which prior to an actual operation of a motor, a plurality of switching elements are driven with a predetermined PWM on/off drive signal corresponding to a carrier frequency and presence/absence of a common mode filter connected to a line for supplying power to the motor is determined; and
    a normal operation mode in which after the initial setting mode, a PWM control method is changed and set in accordance with a result of the determination of the presence/absence of the common mode filter.

7. The power converter according to claim 6, wherein in the initial setting mode, the predetermined on/off drive signal is outputted such that a first combination in which all switching elements on an upper arm among the plurality of switching elements are in ON states and all switching elements on a lower arm among the plurality of switching elements are in OFF states and a second combination in which all the switching elements on the upper arm are in OFF states and all the switching elements on the lower arm are in ON states are alternated in carrier cycles.

8. The power converter according to claim 6, wherein in the initial setting mode, when it is determined that the common mode filter is added, the carrier frequency is set on the basis of a filter current flowing through the common mode filter.

9. The power converter according to claim 6, wherein in the initial setting mode, when it is determined that the common mode filter is added, a resonant frequency of the common mode filter is calculated on the basis of change of a filter current flowing through the common mode filter which change corresponds to change of the carrier frequency.

10. The power converter according to claim 6, wherein in the normal operation mode, when it is determined that the common mode filter is added, the PWM control method is changed and set to a method other than a 2-phase modulation.

11. A power converter comprising:
  a main circuit section including a plurality of switching elements and a current detector which detects an output current;
  a drive controller which outputs a PWM on/off drive signal to the switching elements, prior to an actual operation, the drive controller outputting a predetermined PWM on/off drive signal to drive the switching elements such that a first combination in which all the switching elements on an upper arm are in ON states and all the switching elements on a lower arm are in OFF states and a second combination in which all the switching element on the upper arm are in OFF states and all the switching elements on the lower arm are in ON states are alternated in carrier cycles;
  a determination section which, prior to the actual operation, determines presence/absence of a common mode filter connected to a line for supplying power to a motor;
  a PWM control method changing/setting section which, during the actual operation, changes and sets a PWM control method in accordance with a result of the determination of the presence/absence of the common mode filter; and
  a carrier frequency changing/setting section which, during the actual operation, changes and sets the carrier frequency on the basis of a filter current flowing back through the main circuit section and the common mode filter.

* * * * *